Sept. 19, 1939.    P. H. SULLIVAN    2,173,456
CONVERSION OF GASEOUS HYDROCARBONS
Filed Nov. 14, 1936
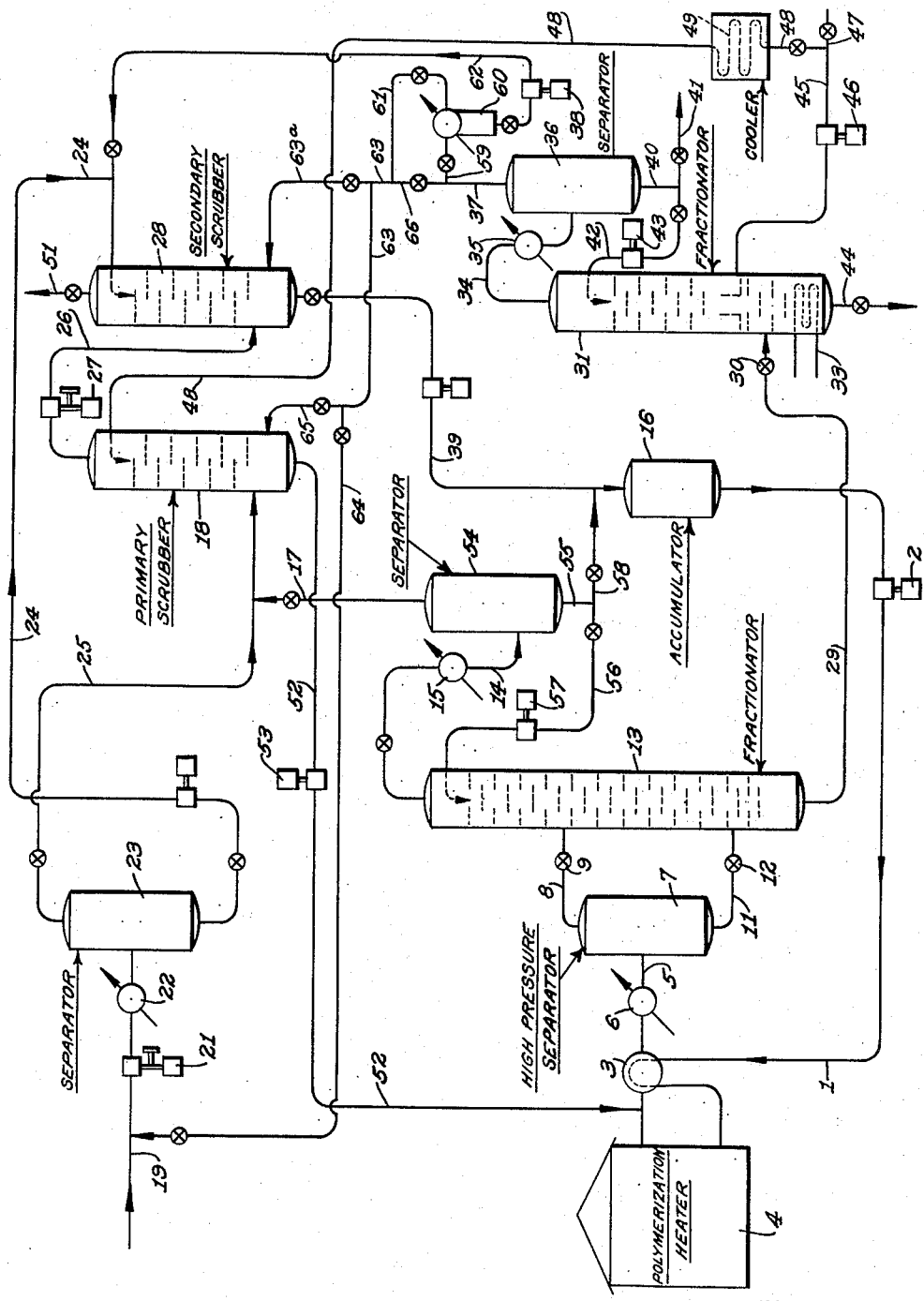
INVENTOR Patented Sept. 19, 1939

2,173,456

UNITED STATES PATENT OFFICE 2,173,456

CONVERSION OF GASEOUS HYDROCARBONS

Pike H. Sullivan, New York, N. Y., assignor to Process Management Company, Inc., New York, N. Y., a corporation of Delaware Application November 14, 1936, Serial No. 110,780

8 Claims. (Cl. 196—10)

This invention relates to the conversion of normally gaseous hydrocarbons to normally liquid hydrocarbons and particularly to the conversion, by polymerization, of normally gaseous hydrocarbons containing two to four carbon atoms per molecule to normally liquid hydrocarbons including gasoline constituents.

The invention contemplates introducing normally gaseous hydrocarbons, obtained for example, from an oil cracking operation, as fresh feed to the polymerization unit, by forcing them under pressure and with appropriate cooling to a high pressure separator wherein a liquefied fraction and a gaseous fraction are separated. The liquefied fraction, containing principally hydrocarbons having three and four carbon atoms per molecule, is withdrawn from the separator and passed to a secondary scrubber as an absorbing medium for unreacted gases from the polymerization system, said gases having been previously passed through a primary scrubber using an oil preferably heavier than gasoline, as the absorbing medium. The gaseous fraction from the separator may be passed to the primary scrubber for mixture with the unreacted gases from the polymerization system.

The liquefied fraction of the gases from the separator absorbs valuable constituents from the unreacted and other hydrocarbon gases in the secondary scrubber and the enriched normally gaseous absorbing medium, in admixture with other suitable normally gaseous hydrocarbons from the polymerization system, is subjected to polymerizing conditions of temperature and pressure to convert at least a portion thereof to normally liquid hydrocarbons.

The products of polymerization are suitably cooled and then passed to a high pressure separator preferably maintained under approximately the same pressure as the heating zone. In the separator the products are separated into a liquid fraction and a gaseous fraction which are passed to a fractionator at different levels. The fractions are further fractionated in the fractionator to obtain a normally gaseous fraction containing any fixed gases such as hydrogen and methane and other hydrocarbons containing from two to four carbon atoms per molecule, and a liquid fraction containing gasoline constituents and heavier oils.

The gaseous fraction removed from the fractionator is cooled to separate a portion thereof as condensate which forms a portion of the charge to the polymerizing zone, and the uncondensed portion is passed successively to the primary and secondary scrubbers to recover valuable constituents therefrom. The fixed gases comprising mostly hydrogen and methane and optionally a controlled amount of ethane are discharged from the system at an upper part of the secondary scrubbing zone.

The liquid fraction formed in the fractionator is passed to a second fractionator wherein gasoline constituents are separated from heavier oils. A portion at least of the heavier oils is passed to the primary scrubber as an absorbing medium therefor. The scrubbing medium from the primary scrubber containing hydrocarbon gases dissolved therein is used, in part at least, as a cooling medium to quench the hot products of polymerization leaving the polymerizing heater.

In order to make my invention more clearly understood, I have shown in the accompanying drawing means for carrying the same into practical effect without limiting the improvements in their useful applications to the particular embodiment which, for the purpose of explanation, has been made the subject of illustration.

In the drawing, the single figure is a somewhat diagrammatic elevational view of apparatus capable of carrying out my inventiton.

Referring to the drawing, normally gaseous hydrocarbons in liquid condition containing both saturated and unsaturated constituents of from two or three to four carbon atoms per molecule are conducted from a suitable source of supply, as will be hereinafter explained, through a line 1 and a heat exchanger 3 by a pump 2 to a suitable gas polymerization furnace 4. The normally gaseous hydrocarbons of the above character passing through the furnace 4 as a stream of restricted cross-sectional area are subjected therein to polymerizing conditions of temperature and pressure to effect conversion thereof into normally liquid gasoline-like constituents. The stream of normally gaseous hydrocarbons is preferably heated in the furnace 4 to a temperature of between about 750° to 1250° F. while being maintained under a superatmospheric pressure of from 400 pounds per square inch to 3000 pounds per square inch, or higher. The products of polymerization leaving the polymerization furnace 4 are passed through a line 5 wherein they are appropriately cooled by intimate contact with enriched absorbent oil from a line 52, passage through the heat exchanger 3 and a cooler 6 which may, if desired, be of the refrigeration type, that is, a cooler wherein normally gaseous hydrocarbons are expanded and the cold resulting from the expansion thereof is utilized as a cooling source for the products of polymerizattion. The thus cooled products of polymerization, at a temperature below that at which active polymerization takes place and including the enriched oil introduced directly thereinto through the line 52, are conducted to a high-pressure separator 7 maintained under substantially the same superatmospheric pressure as the furnace 4.

The products entering the high-pressure separator 7 are therein separated into gaseous and liquid fractions, the gaseous fraction being withdrawn through a line 8 controlled by a pressure-reduction valve 9 and the liquid fraction being withdrawn through a line 11 controlled by a valve 12. These fractions enter a common fractionator 13, maintained under a pressure of from about 100 to 400 pounds per square inch and provided with suitable fractionating trays or plates, at different elevations, and are therein fractionated to separate a normally gaseous fraction containing hydrogen, methane, and saturated and unsaturated hydrocarbons of from two to four carbon atoms per molecule, and a liquid fraction containing the polymerized gasoline-like constituents and heavier oil which collects in the lower portion of the fractionator.

The normally gaseous fraction separated in the fractionator 13 is passed through line 14 and condenser 15 to separator 54. In passing through the condenser 15 part of the normally gaseous hydrocarbons is liquefied. Part of the liquefied hydrocarbons may be returned to the fractionator 13 as reflux therefor through lines 55 and 56 by means of pump 57. The remainder may be re-processed to normally liquid hydrocarbons and is passed through lines 58 and 39 to accumulator 16 where it forms part of the recycled stock being returned to the polymerization furnace 4 through line 1.

Unliquefied constituents passing overhead from separator 54 are withdrawn through line 17 and passed to a primary scrubber 18 by means of line 25 wherein they are scrubbed to remove valuable constituents therefrom. The unliquefied constituents passing overhead from separator 54 consist essentially of substantially all the hydrogen and methane from the polymerization reaction products, and normally they also contain some $C_2$, $C_3$ and $C_4$ hydrocarbons and even some $C_5$ hydrocarbons. The amount of the heavier of these hydrocarbons depends on the degree of fractionation and efficiency of separation. The scrubber 18 functions to remove from gases passing therethrough the heavier valuable constituents such as $C_5$ hydrocarbons and a large proportion of the $C_4$ hydrocarbons. The scrubbed gases pass overhead from scrubber 18 through line 26 to secondary scrubber 28 wherein they are maintained at a higher pressure than in scrubber 18 by means of compressor 27.

The invention contemplates utilizing part of the fresh gases introduced into the system as feed stock as a liquid scrubbing medium for the non-reacted gases passing upwardly through the secondary scrubber 28. Fresh feed gas from any suitable source and ordinarily containing hydrogen, methane and higher hydrocarbons, which may include both saturated and unsaturated constituents of from two to four carbon atoms per molecule, or which may be natural gas, is introduced through a line 19 and forced by pump 21 through cooler 22 wherein the compressed gases are cooled. The cooler 22 may be of the refrigeration type, thereby cooling the fresh feed gases to a temperature sufficiently low to liquefy part thereof. The thus cooled gases are passed to a separator 23 maintained at a pressure of about 100 to 400 pounds per square inch wherein separation of the liquefied gases and others is accomplished. The liquefied fraction, which comprises principally hydrocarbons containing three and four carbon atoms per molecule, is withdrawn from the separator 23 and passed through line 24 to the upper portion of the secondary scrubber 28. The liquefied gases under the conditions prevailing in scrubber 28 remain in liquid condition and absorb the remaining valuable constituents in the unreacted gases passing upwardly through scrubber 28. Undissolved gases containing mostly hydrogen and methane and controlled amounts of ethane, if desired, are discharged from the scrubber 28 through valve-controlled line 51.

Unreacted gases separated in the separator 23 are passed through a line 25 and are mixed with gases passing through line 17 from separator 54, the admixed gases passing to the primary scrubber 18. The gases entering the primary scrubber 18 are therein scrubbed with absorbent material heavier than the liquefied gases utilized as a scrubbing medium in the secondary scrubber 18, the absorbent material being preferably an oil heavier than gasoline from a source explained hereinafter.

Returning now to the fractionator 13, the liquid fraction separated therein and comprising the polymerized gasoline-like constituents and heavier oil is withdrawn from the bottom of the fractionator 13 and passed through a line 29, controlled by a pressure-control valve 30, to a fractionator 31, maintained at a pressure of about 25 to 100 pounds per square inch, and having an intermediate trap-out tray 32 and a suitable reboiling means 33 at the bottom thereof. The liquid fraction entering the fractionator 31 is therein fractionated to separate the gasoline-like constituents and any lighter products as an overhead fraction from the heavier oils. The overhead gasoline fraction is withdrawn from the fractionator 31 through a line 34 and passes through a condenser 35 to a gasoline receiver 36.

The gaseous constituents contained in the overhead fraction will comprise any $C_4$ and $C_5$ hydrocarbons not desired in the gasoline fraction and may contain as well $C_2$ and $C_3$ hydrocarbons, and may even include some small proportion of methane and hydrogen, not separated overhead in fractionator 13. The proportion of lighter gases naturally will depend on the degree of fractionation in fractionator 13. The overhead gases are withdrawn from receiver 36 through line 37. If the gases consist substantially entirely of $C_3$ and heavier hydrocarbons with a minor proportion of $C_2$ hydrocarbons the entire fraction may be passed to condenser 60 wherein it is liquefied and collected. From condenser 60 the resulting condensate may be pumped through lines 62 and 24 to scrubber 28 wherein it functions as scrubbing liquid in the same manner as the liquefied gases pumped through line 24 from separator 23. Gases unliquefied in condenser 60 pass through lines 61, 63 and 65 to primary scrubber 18 wherein they are scrubbed to remove heavier valuable constituents therefrom, such as $C_5$'s and $C_4$'s and possibly $C_3$'s. These gases may also be passed directly to secondary scrubber 28, through lines 61, 63 and 63a, and these may be desirable where $C_3$ and heavier hydrocarbons are thoroughly removed by condenser 60. As a further modification where the overhead gases from receiver 36 are mainly $C_3$ and heavier hydrocarbons they may be passed directly to mixture with fresh feed through lines 37, 66, 63 and 64. The C₃ and heavier hydrocarbons contained therein are then condensed and separated in separator 23 together with the similar portion of the fresh feed and are passed as scrubbing medium through line 24 to secondary scrubber 28. If the gases in line 37 consist largely of C₂ and lighter gases they may be passed directly to primary scrubber 18 through lines 66, 63 and 65, or they may be passed through condenser 60 for the removal of heavier constituents therefrom to be used as scrubbing material in scrubber 28, the remainder passing to scrubber 18 or through lines 61, 63 and 63a directly into the lower part of secondary scrubber 28, as described above.

The overhead from receiver 36 may thus furnish a substantial part of the scrubbing medium for scrubber 28, or it may, in some instances, furnish the whole quantity of scrubber medium required therein. Where suitable gases are present in the overhead from receiver 36 to furnish all the scrubbing medium necessary in scrubber 28 the liquefied gases from separator 23 may be passed directly to accumulator 16.

Gasoline-like hydrocarbons are withdrawn from the receiver 36 through a line 40 and part sent to storage through a line 41. Another part of the gasoline-like hydrocarbons may be passed through a line 42 by a pump 43 to the upper part of the fractionator 31 as reflux therefor.

The liquefied gaseous hydrocarbons entering the scrubber 28 through line 24 and the unreacted gases from the polymerization system dissolved therein are withdrawn from the scrubber 28 through a line 39 and mixed with the gaseous hydrocarbons from separator 54 in accumulator 16 from which the feed for the furnace flow is withdrawn through line 1.

Oils heavier than the gasoline-like constituents separated in the fractionator 31 are further separated into tar and a relatively clean gas oil. This separation may be accomplished within the fractionator 31, the tar being withdrawn therefrom through a line 44 after lighter constituents therein are driven off by heat from the steam coil 33. A relatively clean gas oil resulting from the polymerization of the normally gaseous hydrocarbons, as well as gas oil which may be initially introduced into the system during the starting-up operation, is collected within the fractionator 31 on the trap-out tray 32 which is located above the point of entry of liquids from line 29 and withdrawn therefrom through a line 45. A part of the relatively clean gas oil may be discharged from the system through a line 47. The remainder or all of the gas oil may be forced by a pump 46 through a line 48, in which is interposed a suitable cooler 49, to the upper portion of the secondary scrubber 18. If sufficient gas oil is not produced in the system for the purpose specified, oil from an extraneous source may be introduced through line 47.

The relatively clean gas oil which accumulates in the bottom of scrubber 18 and containing normally gaseous hydrocarbons dissolved therein is passed through a line 52 by a pump 53 to line 5 to intimately contact the hot products of polymerization leaving the furnace 4 whereby the gas oil and absorbed gases act as a cooling medium for the hot gases to inhibit overpolymerization and introduce the valuable normally gaseous (3 and 4 carbon atoms) constituents contained in the gas oil to the system.

A function of the two-stage absorption system represented by scrubbers 18 and 28 is to scrub the gases passing overhead from separators 23, 54 and receiver 36 to remove therefrom in scrubber 18 the heavier desirable constituents such as C₄ and C₅ hydrocarbons whereby they are incorporated in the cooling liquid used as a quench for the hot polymerization products and are returned to the fractionator 13 whereby they are subjected to reprocessing in the system. The secondary scrubber 28 utilizes as an absorbent liquefied gases which are most efficient for the absorption of the lighter desirable constituents in the gases passing therethrough, such as C₂'s and C₃'s. Such an absorbent material functions most efficiently in the absence of the heavier hydrocarbons in the gases and acts to remove substantially completely all desirable constituents in the gases before their release from the system. The constituents recovered in the secondary scrubber 28 become part of the charge to the polymerization heater together with the absorbent medium in which they are mixed. The two-stage scrubber therefore functions to recover valuable constituents from the gases most efficiently and at the same time provides for selectively recovering them and treating them in a most efficient manner in the system.

It will be understood by those skilled in the art that, while I have described my invention with preferred operating examples, it is not limited in its broader aspects to such operating details as have been set forth hereinabove by way of example, but may variously be practiced and embodied within the scope of the claims hereinafter made.

I claim:

1. The method of converting normally gaseous hydrocarbons to normally liquid hydrocarbons including gasoline constituents which comprises subjecting normally gaseous hydrocarbons to elevated conditions of temperature and pressure to effect conversion thereof to normally liquid hydrocarbons, separating the products of conversion into a gaseous phase and a liquid phase including the normally liquid constituents of the conversion products, pasing at least a portion of the normally gaseous hydrocarbons thus separated through a primary scrubbing zone in intimate contact with a scrubbing medium consisting of normally liquid hydrocarbon oil, admixing enriched scrubbing medium from said primary scrubbing zone with the hot products of conversion to cool said hot products, passing unabsorbed gases from said primary scrubbing zone through a secondary scrubbing zone in intimate contact with a scrubbing medium consisting of liquefied normally gaseous hydrocarbons, introducing normally gaseous hydrocarbons under pressure into the system as fresh charging stock therefor, effecting a separation of said fresh charging stock into a liquid fraction and a gaseous fraction, passing the liquid fraction of said fresh charging stock to said secondary scrubbing zone as a liquid scrubbing medium therefor, and subjecting enriched liquid scrubbing medium from the secondary scrubbing zone to said elevated conditions of temperature and pressure.

2. The method in accordance with claim 1 wherein the separation of the products of conversion is controlled to effect separation thereof into a normally gaseous fraction and a normally liquid fraction, a portion of said normally gaseous fraction is liquefied, the liquefied portion thus obtained is subjected to said elevated conditions of temperature and pressure in admixture with said enriched scrubbing medium from the secondary scrubbing zone, and remaining uncondensed gases from the products of conversion are passed through said primary scrubbing zone.

3. The method in accordance with claim 1 wherein the liquid fraction separated from the products of conversion is fractionated into a liquid fraction consisting of constituents thereof boiling above the gasoline boiling range and a vapor fraction consisting of lower boiling hydrocarbons, the vapor fraction thus obtained is fractionated to separate therefrom as a condensate a gasoline fraction, remaining uncondensed gases from said vapor fraction are treated to effect liquefaction of a portion thereof, and at least a portion of said liquefied gases thus obtained is passed to said secondary scrubbing zone as a liquid scrubbing medium therefor.

4. The method in accordance with claim 1 wherein the liquid fraction separated from the products of conversion is fractionated to obtain therefrom a liquid fraction consisting of the constituents thereof boiling above the gasoline boiling range, and at least a portion of said last-mentioned liquid fraction is passed to said primary scrubbing zone as liquid scrubbing medium therefor.

5. The method in accordance with claim 1 wherein the gaseous fraction obtained from the separation of the fresh charging stock is passed through said primary scrubbing zone.

6. The method in accordance with claim 1 wherein at least a portion of the enriched scrubbing medium from the primary scrubbing zone is admixed with the hot products of conversion prior to said separation thereof.

7. The method of converting normally gaseous hydrocarbons to normally liquid hydrocarbons including gasoline constituents which comprises subjecting normally gaseous hydrocarbons to elevated conditions of temperature and pressure to effect conversion thereof to normally liquid hydrocarbons, separating the products of conversion into a gaseous phase and a liquid phase including the normally liquid constituents of the conversion products, passing at least a portion of the normally gaseous hydrocarbons thus separated through a primary scrubbing zone in intimate contact with a scrubbing medium consisting of normally liquid hydrocarbon oil, admixing enriched scrubbing medium from said primary scrubbing zone with the hot products of conversion to cool said hot products, passing unabsorbed gases from said primary scrubbing zone through a secondary scrubbing zone in intimate contact with a scrubbing medium consisting of liquefied normally gaseous hydrocarbons, and subjecting enriched liquid scrubbing medium from the secondary scrubbing zone to said elevated conditions of temperature and pressure.

8. The method of converting normally gaseous hydrocarbons to normally liquid hydrocarbons including gasoline constituents which comprises subjecting normally gaseous hydrocarbons to elevated conditions of temperature and pressure to effect conversion thereof to normally liquid hydrocarbons, separating the products of conversion into a gaseous phase and a liquid phase including the normally liquid constituents of the conversion products, passing at least a portion of the normally gaseous hydrocarbons thus separated through a primary scrubbing zone in intimate contact with a scrubbing medium consisting of normally liquid hydrocarbon oil, admixing enriched scrubbing medium from said primary scrubbing zone with the hot products of conversion to cool said hot products, passing unabsorbed gases from said primary scrubbing zone through a secondary scrubbing zone in intimate contact with a scrubbing medium consisting of liquefied normally gaseous hydrocarbons, introducing liquefied normally gaseous hydrocarbons from an extraneous source into the said secondary scrubbing zone as liquid scrubbing medium therefor, and subjecting enriched liquid scrubbing medium from the secondary scrubbing zone to said elevated conditions of temperature and pressure.

PIKE H. SULLIVAN.